United States Patent
Knauer

(10) Patent No.: US 9,987,919 B2
(45) Date of Patent: Jun. 5, 2018

(54) FLAP SYSTEM FOR CONTROLLING A VEHICLE COOLING SYSTEM

(71) Applicant: Magna Exteriors GmbH, Sailauf (DE)

(72) Inventor: Bernd Knauer, Stuttgart (DE)

(73) Assignee: MAGNA Exteriors GmbH, Sailauf (DE)

( * ) Notice: Subject to any disclaimer, the term of this patent is extended or adjusted under 35 U.S.C. 154(b) by 0 days. days.

(21) Appl. No.: 15/597,901

(22) Filed: May 17, 2017

(65) Prior Publication Data

US 2017/0341505 A1 Nov. 30, 2017

(30) Foreign Application Priority Data

May 25, 2016 (DE) .......... 10 2016 209 156

(51) Int. Cl.
*B60K 11/08* (2006.01)
*B60K 11/04* (2006.01)

(52) U.S. Cl.
CPC ................. *B60K 11/085* (2013.01)

(58) Field of Classification Search
CPC ......... B60K 11/04; B60K 11/06; B60K 11/08; B60K 11/085
See application file for complete search history.

(56) References Cited

U.S. PATENT DOCUMENTS

| 4,926,921 A * | 5/1990 | Heinemann .......... B60K 11/085 160/115 |
| 5,141,026 A * | 8/1992 | Collette .............. B60K 11/085 137/601.09 |
| 8,500,528 B2 | 8/2013 | Leonhard et al. |
| 2012/0110909 A1* | 5/2012 | Crane ................. B60K 11/085 49/70 |
| 2013/0092463 A1 | 4/2013 | Hori |
| 2013/0223980 A1* | 8/2013 | Pastrick .................. F01D 5/00 415/1 |
| 2013/0284401 A1* | 10/2013 | Kiener ..................... F01P 7/02 165/98 |
| 2014/0194052 A1* | 7/2014 | Asano .................. B60K 11/085 454/335 |
| 2014/0216834 A1 | 8/2014 | Elliott et al. |

FOREIGN PATENT DOCUMENTS

| DE | 102013007158 A1 | 11/2013 |
| DE | 102012213992 A1 | 2/2014 |
| EP | 2233341 A1 | 9/2010 |
| EP | 2233342 A1 | 9/2010 |
| EP | 2335963 A1 | 6/2011 |

* cited by examiner

*Primary Examiner* — Frank B Vanaman
(74) *Attorney, Agent, or Firm* — Jordan IP Law, LLC; Todd A. Vaughn

(57) ABSTRACT

A flap system for supplying cooling air of a motor vehicle, and which includes a drive component which receives and supports at least one flap element to be pivoted about a longitudinal axis. The flap element is to be supported at ends thereof by a shaft which is received in a cylindrical bearing receiving member of a rail.

15 Claims, 1 Drawing Sheet

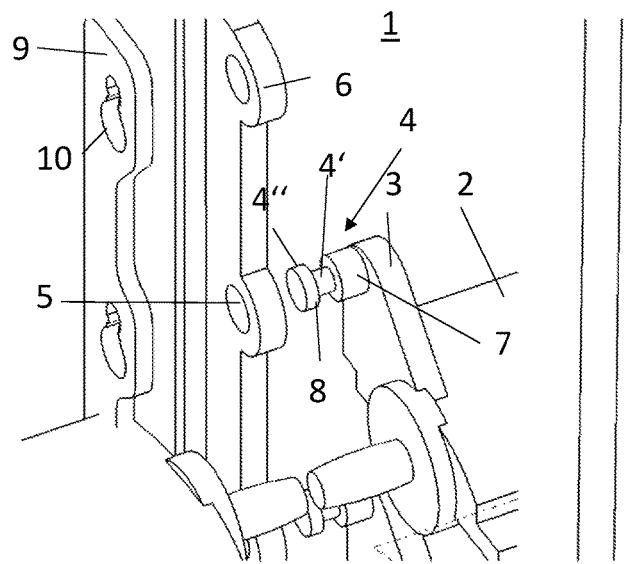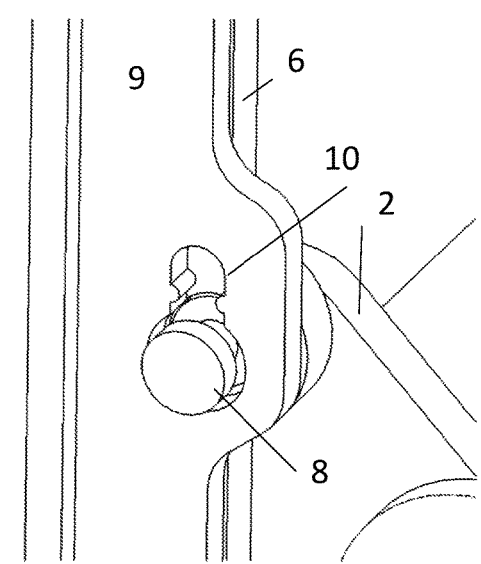
Fig. 1          Fig. 2
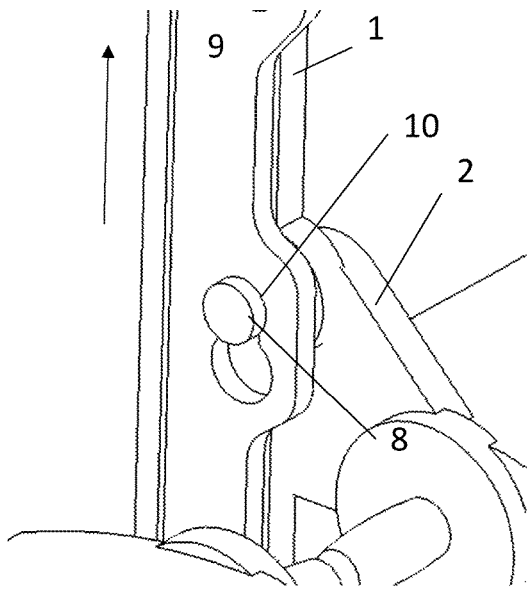
Fig. 3

FLAP SYSTEM FOR CONTROLLING A VEHICLE COOLING SYSTEM

CROSS-REFERENCE TO RELATED APPLICATIONS

The present application claims priority 35 U.S.C. § 119 to German Patent Publication No. DE 102016209156.5 (filed on May 25, 2016), which is hereby incorporated by reference in its entirety.

TECHNICAL FIELD

Embodiments relate to a flap system for controlling the cooling requirement of a motor vehicle, in which individual flaps of the flap system are connected to each other.

BACKGROUND

In modern motor vehicles, in order to improve the warm-up behaviour of the engine, the air flow to the heat exchanger is controlled by means of adjustable elements. The adjustable elements, the closure elements, are in most cases a number of pivotably supported plates, wherein the pivot axes thereof are orientated parallel with each other and they are on the whole rotatably arranged in a frame. The frame together with the plate arrangement is arranged downstream of the design component of the radiator grille and thus arranged upstream of the heat exchanger of the engine. Such an arrangement may also be arranged in a flow channel, via which cooling air is supplied from an opening arranged in the bodywork to the heat exchanger, the radiator of the engine. By closing the cold air supply during the warm-up or by controlling the quantity of cooling air in accordance with the engine temperature, the optimum operating temperature is reached more rapidly or can be kept within a narrow temperature range. Examples of the devices described are set out in EP 2 233 341 A1, EP 2 233 342 A1.

The closure elements set out are constructed as elongate planar elements in substantially planar form and can be pivoted about an axis which usually extends centrally through the planar element. A plate having a streamlined cross-section is set out in EP 2 335 963 A1.

Known closure elements in most cases comprise plastics material and are introduced into the frame which receives them by means of deformation, bending. As a result of bending of the plate member, the pins of the plates which constitute the rotatable support are introduced into corresponding receiving members of a frame.

With a locked geometry in conventional manner, the force transmission is not completely possible in the active direction of the drive. There is thereby produced a flexibility of the connection, which can lead to malfunctions. The locking in conventional systems is additionally often partially constructed in the active direction of the drive. The locking must thereby be constructed to be more stable than necessary in order to ensure the function.

SUMMARY

Embodiments relate to a flap system which has no flexibility of the connection between individual flaps, and is improved both in the active direction of the drive forces and perpendicularly thereto.

This may be achieved with a flap system for supplying cooling air of a motor vehicle, comprising a drive component which receives at least one flap element which is to be pivoted about a longitudinal axis in a supporting manner. The flap element is supported at ends thereof with a shaft in a cylindrical bearing receiving member of a rail in each case, the shaft having a bearing region and a closure region.

Advantageously, the flap system comprises for guiding cooling air of a motor vehicle a drive component which receives at least one flap element which can be pivoted about a longitudinal axis in a supporting manner, wherein the flap element is supported at the ends thereof with a shaft in a cylindrical bearing receiving member of a rail in each case, wherein the shaft has a bearing region and a closure region.

It is advantageous in this instance for a closure rail to be placed against the rail, wherein keyhole-shaped recesses lock the closure regions of the shaft.

In this instance, the locking is improved perpendicularly to the active direction by means of keyhole geometry.

DRAWINGS

Embodiments will be illustrated by way of example in the drawings and explained in the description below.

FIG. 1 illustrates a perspective view of a flap system, in accordance with embodiments.

FIG. 2 illustrates a perspective view of a closure rail of the flap system of FIG. 1.

FIG. 3 illustrates a perspective view of movement of the closure rail of the flap system of FIG. 1 to downward position.

DESCRIPTION

As illustrated in FIGS. 1-3, a flap system 1 in accordance with embodiments includes a flap 2 having a closure rail 9 with keyhole-shaped recesses 10 having a large and a combined small diameter. The connection to the drive is carried out via a rail 6, which has a plurality of cylindrical openings 5 which enables a complete force absorption of the drive forces in an active direction of the flap system.

The flap 2 has an end region 3 with a tongue to which a shaft 4 is fitted perpendicularly thereto (the tongue), but in extension of the flap axis. The shaft 4 comprises two regions: a bearing region 7 and a closure region 8. The closure region 8 has a diameter which corresponds structurally and operationally to the cylindrical opening 5 so that the shaft 4 may be readily introduced.

The assembly is explained in FIGS. 2 and 3. After the shaft(s) 4 has/have been introduced into the openings 5 of the rails 6, the bearing region 7 of each shaft 4 is located inside the rail 6, the closure region 8 protrudes beyond the rail 6. The closure rail 9 is placed parallel with the surface of the rail 6. To this end, in the keyhole-shaped recess 10, the region having a large diameter is used so that the closure region 8 of the shaft 4 may also be inserted through the closure rail 9. Since the closure region 8 of the shaft 4 comprises a first portion 4' having a small diameter and a second portion 4" having a large diameter, the rails 6 may lock the shaft 4. The length of the first portion 4' is determined in this instance by the thickness of the closure rail 9. To this end, the closure rail 9 is moved, from FIG. 2 to FIG. 3, in downward direction in accordance with the arrow and the keyhole-shaped recess is consequently displaced into the region of the small diameter.

The closure of the connection is carried out perpendicularly to the active direction of the drive.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A flap system to supply cooling air of a motor vehicle, the flap system comprising:
   a flap element configured to be pivoted about an axis;
   a rail having spaced apart openings;
   a shaft to support ends of the flap element and which has a longitudinal axis that extends perpendicularly from a tongue of the flap element, the shaft having a bearing region which extends along the longitudinal axis, and a closure region which extends from the bearing region along the longitudinal axis, the bearing region configured for connection to a corresponding end region of the flap element, and the closure region configured for receipt by an opening of the rail; and
   a closure rail arranged spaced apart from and in parallel with the rail, and which has a recess to receive the closure region when the closure region is received in the opening of the rail to thereby lock the shaft.

2. The flap system of claim 1, wherein the closure rail is to lock the closure region of the shaft in a movement of the closure rail that is parallel relative to the rail.

3. The flap system of claim 1, wherein the closure region comprises a first portion having a first diameter and a second portion having a second diameter.

4. The flap system of claim 3, wherein the first diameter is less than the second diameter.

5. A flap system for a motor vehicle, the flap system comprising:
   a flap element configured to be pivoted about an axis, the flap element having an end region with a tongue;
   a rail having spaced apart openings;
   a shaft to support ends of the flap element and which has a longitudinal axis that extends perpendicularly from the flap element, the shaft having a bearing region which extends along the longitudinal axis, and a closure region which extends from the bearing region along the longitudinal axis, the bearing region being connected to a corresponding end region of the flap element, and the closure region being received by an opening of the rail, the closure region having a first portion and a second portion extending from the first portion, the first portion having a first diameter and the second portion having a second diameter; and
   a closure rail arranged spaced apart from and in parallel with the rail, the closure rail having a recess to receive the closure region when the closure region is received in the opening of the rail to thereby lock the shaft, the recess having a first recess section with a first recess diameter and a second recess section with a second recess diameter that is less than the first recess diameter.

6. The flap system of claim 5, wherein the closure rail is to lock the closure region of the shaft in a movement of the closure rail that is parallel relative to the rail.

7. The flap system of claim 5, wherein the first diameter is less than the second diameter.

8. The flap system of claim 5, wherein the flap system is to supply cooling air for the motor vehicle.

9. A flap system for a motor vehicle, the flap system comprising:
   a flap element configured to be pivoted about an axis;
   a rail having spaced apart openings;
   a shaft to support ends of the flap element, the shaft having a longitudinal axis from which a bearing region and a closure region respectively extend, the bearing region being connected to and extending perpendicularly from a corresponding tongue at an end region of the flap element, and the closure region being received by an opening of the rail, the closure region having a first portion having a first diameter and a second portion having a second diameter; and
   a closure rail arranged spaced apart from and in parallel with the rail, the closure rail having a recess extending therethrough to receive the closure region when the closure region is received in the opening of the rail to thereby lock the shaft in a movement of the closure rail that is which is parallel relative to the rail.

10. The flap system of claim 9, wherein the first diameter is less than the second diameter.

11. The flap system of claim 9, wherein the recess includes a first recess section and a second recess section that extends from the first recess section.

12. The flap system of claim 11, wherein:
   the first recess section has a first recess diameter; and
   the second recess section has a second recess diameter that is different than the first recess diameter.

13. The flap system of claim 12, wherein the second recess diameter is less than the first recess diameter.

14. The flap system of claim 9, wherein the recess and a corresponding opening of the rail are in parallel planes.

15. The flap system of claim 9, wherein the closure region is configured to extend through both the recess and a corresponding opening of the rail to thereby lock the shaft.

* * * * *